INVENTORS: W. B. MACURDY
H. E. NOWECK
BY John C Albrecht
ATTORNEY

March 31, 1964 W. B. MACURDY ETAL 3,127,479

TELEPHONE SWITCHING SYSTEM

Filed Dec. 30, 1960

9 Sheets-Sheet 2

INVENTORS: W. B. MACURDY
H. E. NOWECK

BY John C Albrecht

ATTORNEY

INVENTORS: W. B. MACURDY
H. E. NOWECK
BY John C Albrecht
ATTORNEY

INVENTORS: W. B. MACURDY
H. E. NOWECK
BY John C Albrecht
ATTORNEY

INVENTORS: W. B. MACURDY
H. E. NOWECK
BY John C Albrecht
ATTORNEY

March 31, 1964 W. B. MACURDY ET AL 3,127,479

TELEPHONE SWITCHING SYSTEM

Filed Dec. 30, 1960 9 Sheets-Sheet 6

INVENTORS: W. B. MACURDY
H. E. NOWECK
BY John C. Albrecht
ATTORNEY

INVENTORS W. B. MACURDY
H. E. NOWECK
BY John C Albrecht
ATTORNEY

March 31, 1964 W. B. MACURDY ETAL 3,127,479

TELEPHONE SWITCHING SYSTEM

Filed Dec. 30, 1960 9 Sheets-Sheet 8

INVENTORS: W. B. MACURDY
H. E. NOWECK

BY John C Albrecht

ATTORNEY

March 31, 1964 W. B. MACURDY ETAL 3,127,479

TELEPHONE SWITCHING SYSTEM

Filed Dec. 30, 1960

9 Sheets-Sheet 9

INVENTORS: W. B. MACURDY
H. E. NOWECK
BY John C Albrecht
ATTORNEY

United States Patent Office 3,127,479

Patented Mar. 31, 1964

3,127,479

TELEPHONE SWITCHING SYSTEM

William B. Macurdy, Belmont, Mass., and Herman E. Noweck, Mountain Lakes, N.J., assignors to Bell Telephone Laboratories, Incorporated, New York, N.Y., a corporation of New York Filed Dec. 30, 1960, Ser. No. 79,885

9 Claims. (Cl. 179—18)

This invention relates in general to telephone switching systems and more particularly to the detection and registration of call signaling information in such systems.

For a number of years, telephone switchboards have been equipped with call signaling key sets rather than conventional dials such as are found in the average telephone station apparatus. Key sets are easy to manipulate and it is possible to place a call more rapidly with a key set than with a dial. A reduction in time in placing a call is not only advantageous from the customer's standpoint but also it is advantageous from a telephone switching system standpoint in that expensive central office equipment is held operated for shorter periods of time. In order to bring the advantages of customer key set call signaling to existing telephone switching systems, it is necessary to provide central office equipment which is capable of recognizing and registering the multifrequency call signaling information which is generated by means of subscriber station key sets. Such central office equipment is referred to as a converter and is most advantageously provided on a common basis. That is, such apparatus is advantageously arranged to be shared by a large number of subscriber stations and is associated with a station upon request and then released as soon as the call signaling function is completed.

Customer key set call signaling apparatus is particularly attractive for PBX stations in that new and unusual customer services are available through the use of such station apparatus. In key set call signaling, voice frequency tone signaling is employed. In the past, two-out-of-five tone signaling codes have been utilized and more recently a four by four tone signaling code has been employed. In this latter arrangement, there are two groups of four tones each and a calling signal is transmitted by means of one tone from each of the two groups. It is therefore possible to transmit sixteen discrete signals by means of the eight tones. In that a telephone switching system numbering plan is on a decimal basis, the four by four signaling code provides six discrete signals which may be employed to accomplish new and unusual service features.

Converters are costly; therefore, serious economic problems attend the provision of key set call signaling for PBX stations. A private branch exchange serves a relatively small number of subscriber stations, therefore, it is uneconomical to provide a group of converters for a single PBX. Further, calls originating in a PBX generally require a variable number of digits. For example, calls within a PBX may require two, three, or four digits depending upon the size and complexity of the PBX system, while calls to other company locations or to a telephone central office require one or more directing digits. The operation of converters in a system employing a variable number of digits complicates the problem of rapid converter release to insure minimum converter holding time. It is possible to provide a timing circuit which releases the converter after a fixed period of time which is calculated to insure completion of the call signaling function. However, such an arrangement is uneconomical in that on all calls, except those requiring the maximum number of digits, the converter will be held longer than necessary.

It is an object of this invention to permit a number of PBX's having the same or different PBX numbering plans to be served by a common converter group.

It is another object of this invention to release a converter circuit immediately after the registered call signaling information has been outpulsed.

Advantageously, in accordance with this invention, a group of converters are placed in a central office and are arranged to serve subscriber stations of a number of private branch exchanges having the same or different numbering plans. Economical use is therefore made of the converters as a large number of PBX subscriber stations may thus be served by the central group of converters.

Further, in accordance with this invention, the call signaling information is examined as it is registered in the converter and a conclusion is reached as to the number of digits expected. As soon as the expected number of digits have been registered and outpulsed, the converter is released and it is prepared to accept call signaling information relating to another connection.

The numbering plan of a PBX is tailored to a customer's requirements and the PBX's served by a group of converters will often have a variety of numbering plans. This tends to complicate the problem of timely release of the converters serving such a group of PBX's. However, in accordance with this invention, each converter is provided with a number of translators to examine the call signaling information as registered and thereby determine the number of digits expected. These translators are tailored to the various numbering plans employed by the PBX's served by the converter group and are enabled by means of class signals which originate with the PBX to central office trunks.

A converter trunk which is interposed between a line finder and a first selector of the PBX terminates on the banks of a trunk finder which is connected to the associated central office by means of a modified DX signaling trunk. When a PBX subscriber originates a call, a line finder and the associated converter trunk and first selector are seized. After the converter trunk is seized, a trunk finder in the PBX hunts until the converter trunk becomes associated with one of the modified DX signaling trunks to the central office. A converter finder in the central office in turn hunts until the seized trunk becomes connected to a converter circuit. Dial tone is then returned to the originating PBX subscriber and he may proceed to transmit the call signaling information relating to the called subscriber's number.

A control signal originates in the central office end of the PBX to central office trunk and this signal is conveyed to the converter which has been connected to the trunk in order to select the correct converter translation pattern. The converter can thus process calls from a number of PBX's having the same or different numbering plans and is arranged to release immediately after the last expected digit has been outpulsed.

In accordance with one feature of this invention, a converter group serves a number of private branch exchanges having a variety of numbering plans.

In accordance with another feature of this invention, each converter is equipped with a plurality of translators and the appropriate translator is selectively enabled to process a call.

In accordance with another feature of this invention, trunk circuits connect a PBX to the centrally located converters and a converter control signal originates with the central office end of the trunk circuit.

In accordance with another feature of this invention, converter release signals are transmitted through auxiliary contacts of the converter out-steering relays and each converter is equipped with $N+1$ out-steering relays where N equals the maximum number of digits processed by a converter.

In accordance with another feature of this invention, the PBX to central office trunk circuits respond to multilevel bipolar signals to transmit dial pulse signals and release signals from the converter to the PBX.

The above and other objects and features of this invention can readily be understood with respect to the drawing in which.

Figures 1, 10:
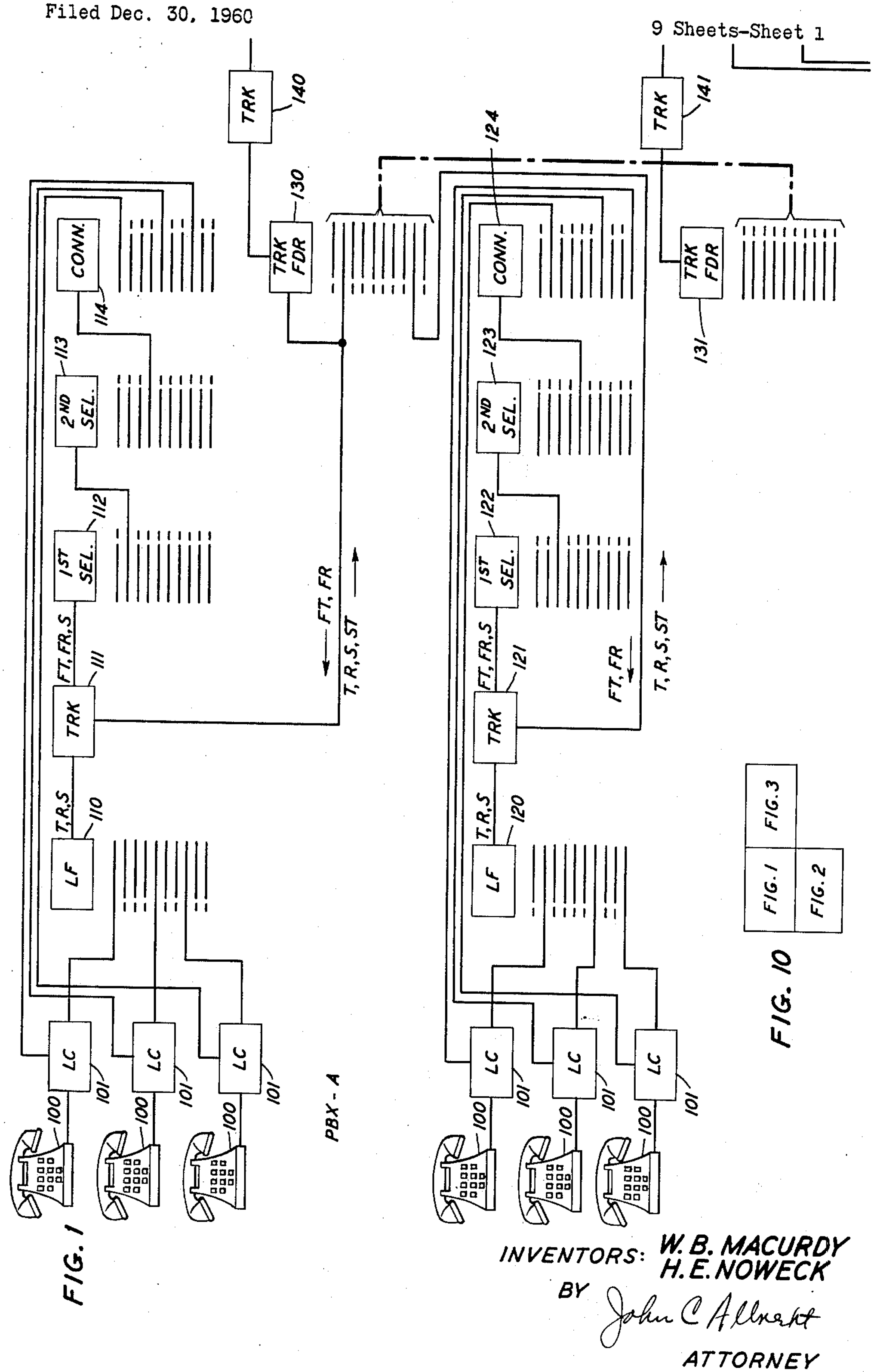
FIG. 1 is a block diagram of a first PBX.
FIG. 10 shows the arrangement of FIGS. 1, 2 and 3.
Figure 2:
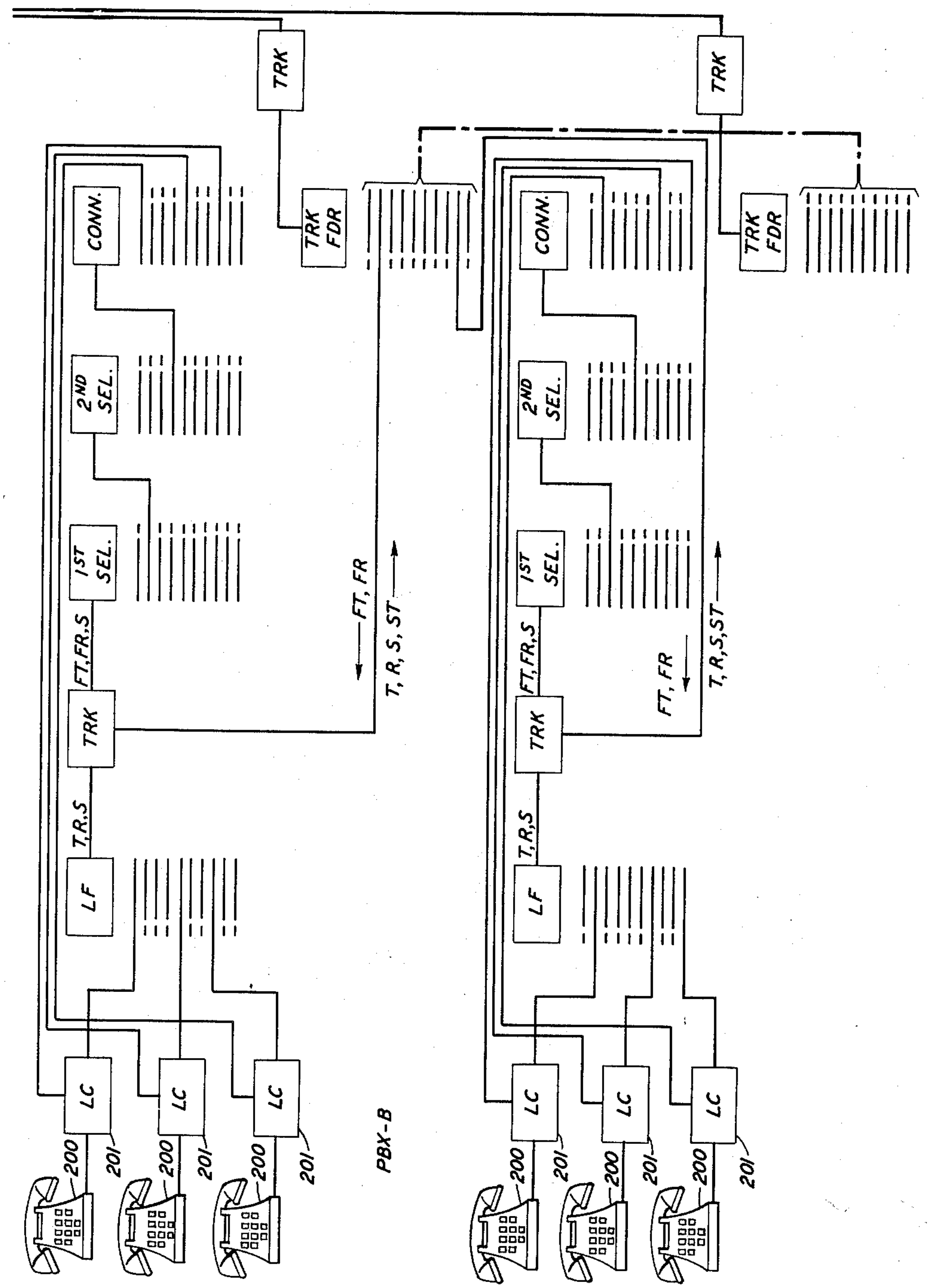
FIG. 2 is a block diagram of a second PBX.
Figure 3:
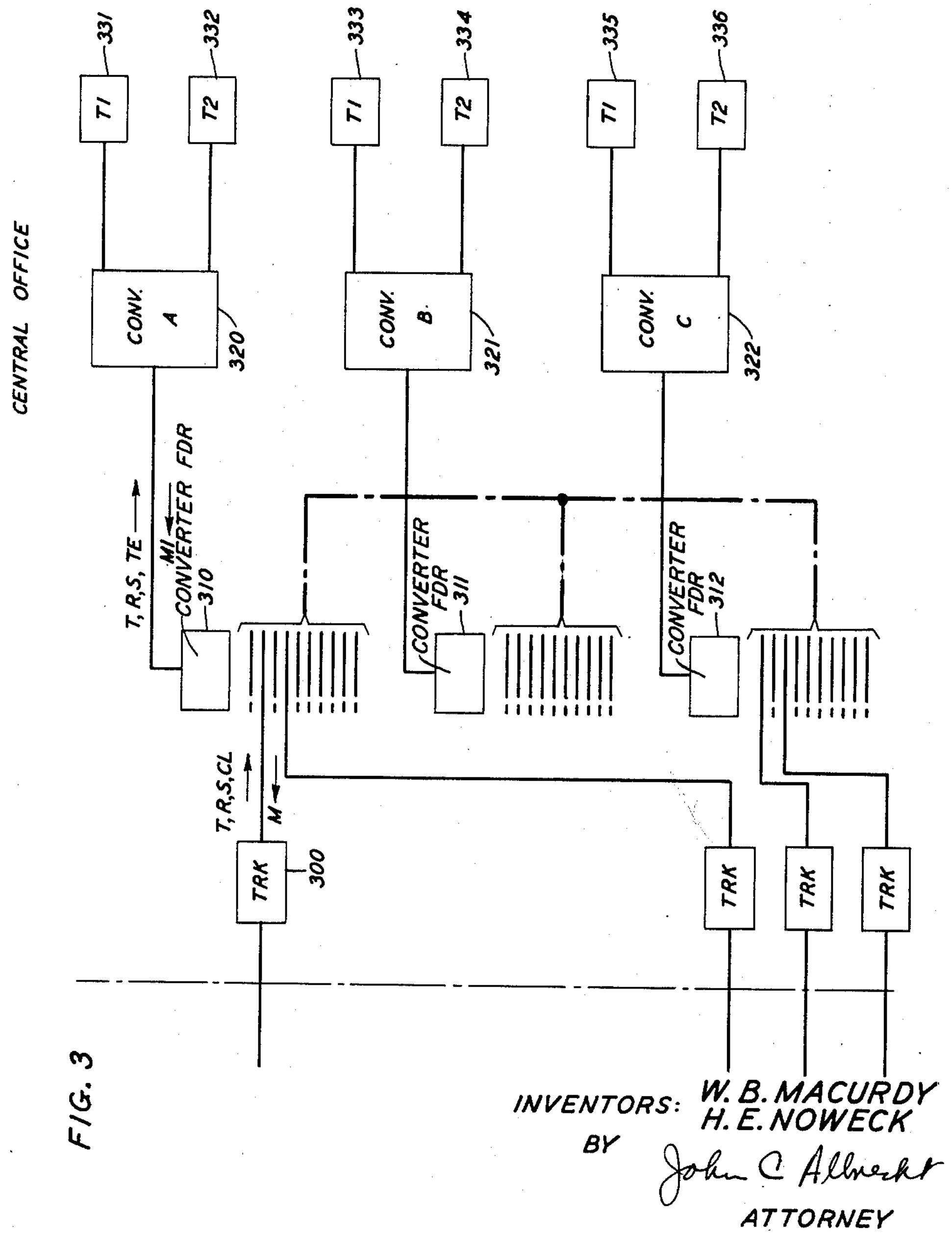
FIG. 3 is a block diagram of the common converter apparatus at a central office.

A general understanding of this invention can be achieved through the system block diagram of FIGS. 1, 2 and 3. FIG. 1 shows station and switching apparatus associated with PBX A; FIG. 2 shows station and switching apparatus associated with PBX B; and FIG. 3 shows central office trunk switching and converter circuits common to PBX A and PBX B.

FIG. 1 shows a plurality of key set subscriber stations 100 and associated line circuits 101. There is a first step-by-step switching train associated with certain of the subscriber stations 100 comprising the line finder 110, the converter trunk 111, the first selector 112, the second selector 113, and the connector 114. There is a second switching train comprising line finder 120, converter trunk 121, first selector 122, second selector 123, and connector 124 associated with other of the subscriber stations 100. The subscriber line circuits, as in any conventional step-by-step system, terminate on the banks of the line finders 110 and 120 for the purpose of originating a call from one of the subscriber stations and terminate on the banks of the connectors 114 and 124 for the purpose of terminating calls to one of the subscriber stations 100.

A converter is required only during the time that a connection is being established through the switching train. That is, a converter must be available to the calling subscriber at the time call signaling information is transmitted from the subscriber station and the converter may be released as soon as all call signaling information has been retransmitted as dial pulses to the switching network. The trunk circuits 111 and 121 serve to split the transmission and signaling paths between the line finder 110 and the first selector 112 and the line finder 120 and at the first selector 122, respectively.

It should be noted at this time that FIGS. 1, 2, and 3 are schematic representations and do not show the detailed connections required.

When one of the subscriber stations 100 requests service, its associated line circuit 101 signals the line finder group circuit and a line finder hunts until a line finder such as 110 and the the converter trunk 111 become associated with the requesting line 100 through the wipers and banks of the finder 110. Upon seizure, the converter trunk such as 111 originates a signal to the trunk finder group circuit and a trunk finder such as 130 or 131 hunts until it becomes associated with the trunk circuit 111 through its wipers and bank terminals. When the trunk finder 130 is seized the associated trunk circuit 140 is energized, and this in turn transmits a seizure signal to the central office trunk circuit 300.

The trunk circuit 300 terminates on the banks and the control circuit of the converter finder 310. The PBX trunk circuit 140, the central office trunk circuit 300 and the connections to the converter finder 310 are shown in greater detail in FIGS. 4 and 5 and are described in detail later herein. When the trunk circuit 300 is seized a converter finder such as 310 hunts until it becomes associated with the trunk 300. The converter finders 310, 311, and 312 are five-wire finders and are permanently associated with the converters 320, 321 and 322.

The converters 320, 321 and 322 are identical and associated with each converter are a number of translators such as 331 through 336. The T1 translators 331, 333 and 335 are identical and bear the translations for PBX A or any other PBX having the same numbering plan as PBX A and the T2 translators 332, 334 and 336 are identical and bear the translation information for PBX B or any other PBX having the same numbering plan as PBX B.

The subscriber stations 200, line circuits 201 and the associated switching trains of FIG. 2 represent the station apparatus and switching equipment for PBX B. FIGS. 2 and 3 show that the PBX to central office converter trunks of PBX B terminate on the banks of the converter finders 310, 311 and 312 in the same manner that the trunk circuits for PBX A are terminated.

The detailed operation of the line finders, trunk finders, selectors and connectors will not be described herein as these system components are well known step-by-step switches. However, the detailed operation of the converter trunk circuit 111 and the PBX to central office trunks 140 and 300 is covered below.

Figure 4:
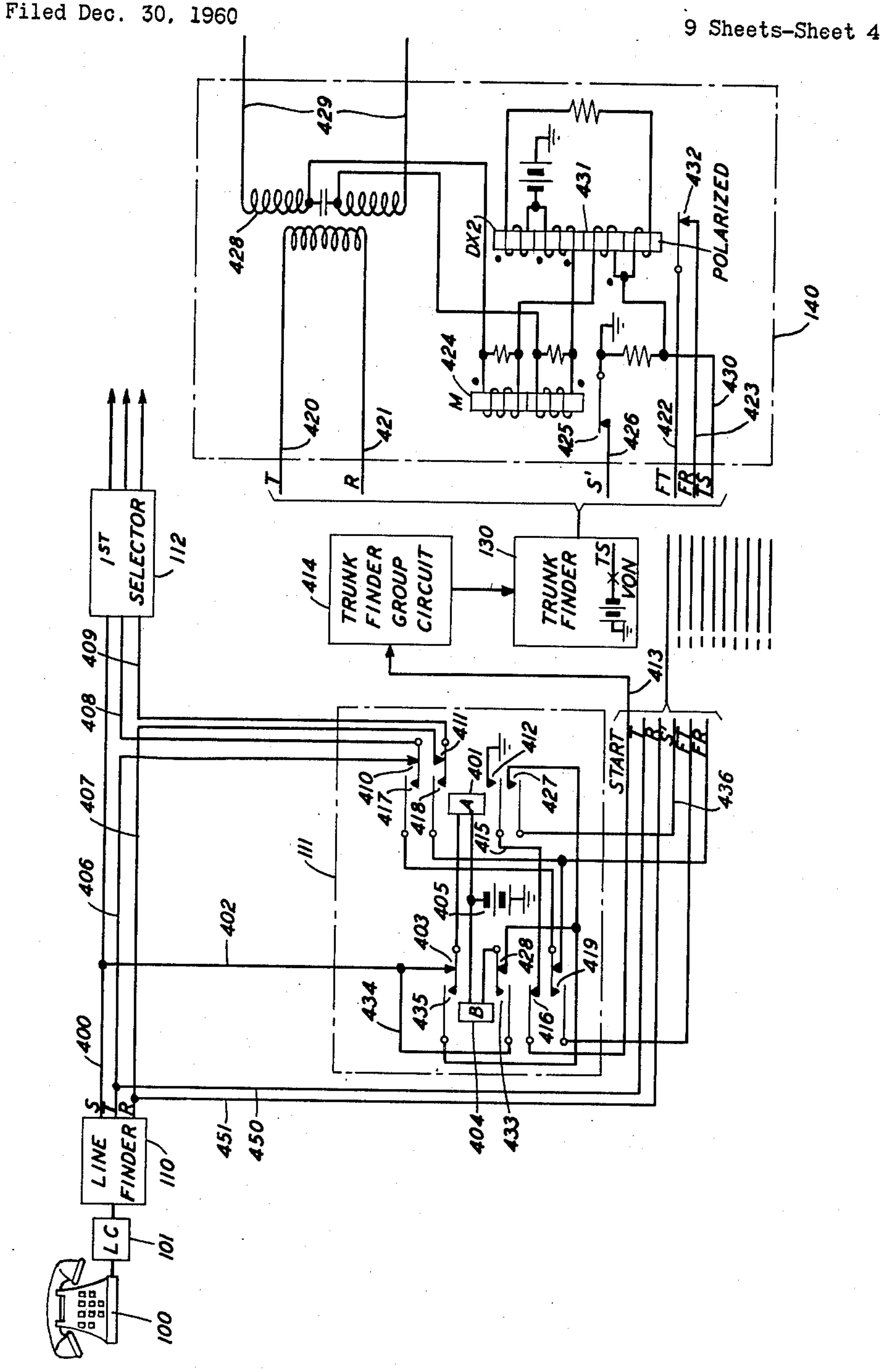
FIG. 4 is a schematic drawing of the converter trunk interposed between the line finder and first selector at the PBX and of the PBX end of the modified DX trunk to the central office.

The line circuit 101 of FIG. 4 responds to a request for service from the subscriber station 100 and in turn the line finder 110 becomes connected to the calling subscriber station 100. Seizure of the line finder 110 places ground potential on the sleeve conductor 400 of the line finder 110 which causes the A relay 401 of the trunk circuit 111 to operate over a path which includes conductor 402, break contact 403 of the B relay 404 and the winding of the A relay 401 to the operating potential 405 which is returned to ground. The converter trunk circuit 111 serves to split the transmission path between the line finder 110 and the first selector 112; to establish an A.-C. signaling path between the line finder 110 and the converter 320; and a D.-C. signaling path from the converter 320 to the first selector 112. The A relay 401 of the converter trunk circuit 111, when operated, transfers the tip and ring conductors 408 and 409 of the first selector 112 from the tip and ring conductors 406 and 407 of the line finder 110 to a D.-C. signaling path from the trunk circuit 140. That is, the FT and FR conductors 422 and 423 from the trunk circuit 140 are connected through the banks of the trunk finder 130 and the make contacts 417 and 418 of the A relay 401 to the tip and ring conductors 408 and 409 of the first selector 112. The connection between the FT conductor 422 and the tip conductor 408 also includes the make contact 419 of the B relay 404. The B relay 404 operates only after the trunk finder 130 has completed hunting to connect the trunk circuit 140 to the trunk circuit 111. The B relay 404 operates over a path which includes ground potential, the break contact 425 of the marginal relay 424, the S′ conductor 426, the trunk finder 130, the make contact 427 of the A relay 401, the break contact 428 of the B relay 404 and the winding of the B relay 404 to the potential source 405. The loop connection between the FT and FR conductors 422 and 423 of the trunk circuit 140 is thus completed to the first selector after the trunk 140 has become connected through the trunk finder 130 to the converter trunk 111.

The B relay 404 locks operated to the sleeve conductor 400 of the line finder 110. The holding path includes the make contact 433 of the B relay 404, conductor 434 and conductor 402 to the sleeve conductor 400. The A relay 401 locks operated to the S′ conductor 436 over a path which includes the make contact 435 of the B relay 404, the make contact 427 of the A relay 401, the conductor 436, the bank and wipers of the trunk finder 130, the S' conductor 426 of the trunk circuit 140 and break contact 425 of the marginal relay 424 to ground potential.

The tip and ring conductors 450 and 451 of the line finder 110 are connected through the trunk finder 130 to the tip and ring conductors 420 and 421 of the trunk circuit 140. An A.-C. signaling path is thus established between the subscriber station 100 and the central office over a path which includes the coil 428 of the trunk circuit 140, the cable pair 429, the coil 500 of the trunk circuit 300, the tip and ring conductors 521 and 522, and the converter finder 310 to tip and ring conductors 511 and 512 of the converter 320.

After a subscriber's station 100 has become operatively associated with a converter such as 320, the following signaling paths are established:

(1) Multifrequency A.-C. signaling path from the subscriber station 100 to the converter 320 via the line finder tip and ring conductors 450 and 451, the trunk finder 130, the trunk circuits 140 and 300 and the converter finder 310;

(2) A D.-C. seizure path from the converter trunk 111 via trunk circuit 140 to the trunk circuit 300;

(3) A D.-C. pulsing path from the converter 320 to the first selector 112;

(4) A D.-C. release signaling path from the converter finder 312 to the trunk circuit 140.

The A.-C. path for multifrequency call signaling information from the subscriber station key set to the converter 320 is well defined in paragraph 1 above.

The D.-C. signaling paths noted in paragraphs 2 through 4 above are obtained through the use of a modified DX signaling circuit. A DX or duplex signaling system is a simplified version of a differential duplex telegraph circuit. The standard DX signaling system provides bidirectional D.-C. signaling and the standard system is modified in accordance with this invention to provide an additional signaling state in one direction. This additional signaling state is achieved through the use of the marginal relay 424 at the PBX location. It is therefore possible to transmit dial pulses and a release signal on a mutually exclusive basis from the central office to the PBX. Standard DX signaling systems are described in an article entitled "DX Signaling, a Modern Aid to Telephone Switching," by N. A. Newell, which was published at page 216 of the June 1960 issue of the Bell Laboratories Record.

A seizure signal is transmitted from the PBX trunk circuit 140 to the central office trunk circuit 300 when battery is placed on the TS conductor 430. The TS conductor 430 is energized by the closure of the VON contacts of the trunk finder 130. As in a standard DX signaling circuit, battery on the TS conductor 430 causes the polarized DX1 relay 502 to operate and this closes an operating path for the C relay 503. This operating path includes ground potential, make contact 504 of the polarized relay 502, the winding of the C relay 503, resistor 505 and potential source 506 returned to ground. Closure of the make contact 504 of the DX1 relay 502 also places ground potential on the start conductor 508 to the converter finder group circuit 509. A converter finder such as 310 is thus energized and hunts until it becomes connected to the trunk circuit 300 which is requesting service. Operation of the DX1 relay 502 also removes ground potential from the S'' conductor 507 and causes this conductor to assume the potential of the source 506. The ground potential which is applied to conductor 510 through the make contact 504 also appears at the simplex of the tip and ring circuit from the coil 500 to the converter 320. As described later herein the above-noted ground on the simplex is employed to hold the converter finder 310 operated. The path from the coil 500 via the conductors 521 and 522 is completed to the tip and ring conductors 511 and 512 to the converter 320 after the converter finder has become connected to the trunk circuit 300.

When the converter finder 310 becomes connected to the trunk circuit 300 ground potential is returned over the S'' conductor 507 and the C relay 503 then releases. This removes the ground potential from the start conductor 508 and thus releases the finder group circuitry.

The converter 320 accepts multifrequency call signaling information over the tip and ring conductors 511 and 512; transmits dial pulse signals over the M1 conductor 513 and a converter finder holding path is provided over the H conductor 514. The converter 320 is arranged to apply bi-polar signals of a first or normal battery potential level to the M1 conductor 513 to transmit dial pulses and a signal of a second increased potential level to transmit a converter release signal. For dial signals the signaling system from the central office to the PBX operates in the manner well known in the art and the polarized relay 431 responds to such signals to open the break contact 432 and thus open the loop to the first selector over the fundamental tip and ring conductors 422 and 423. When release signals of the second or increased potential level are applied to the M1 conductor 513 the polarized relay 431 remains unoperated; however, the marginal relay 424 operates and thus removes ground potential from the S' conductor 426 to signal release of the converter trunk circuit 111 and associated trunk finder 130.

Immediately after the converter 320 is seized, dial tone is returned from the converter 320 to the subscriber station 100 over the path which includes the coil 500, pair 429, and coil 428. The subscriber may then proceed to key the call signaling information to complete a call.

The converter, with respect to the registration of multifrequency call signaling information and the retransmission of this information as dial pulse signals will not be discussed in greater detail as such arrangements are well known in the prior art. For example, in the I. H. Henry Patent 1,916,760, which issued July 4, 1933, there is shown a register sender which is arranged to receive multifrequency call signaling information and to transmit in response thereto dial pulse call signaling information.

Figure 6:
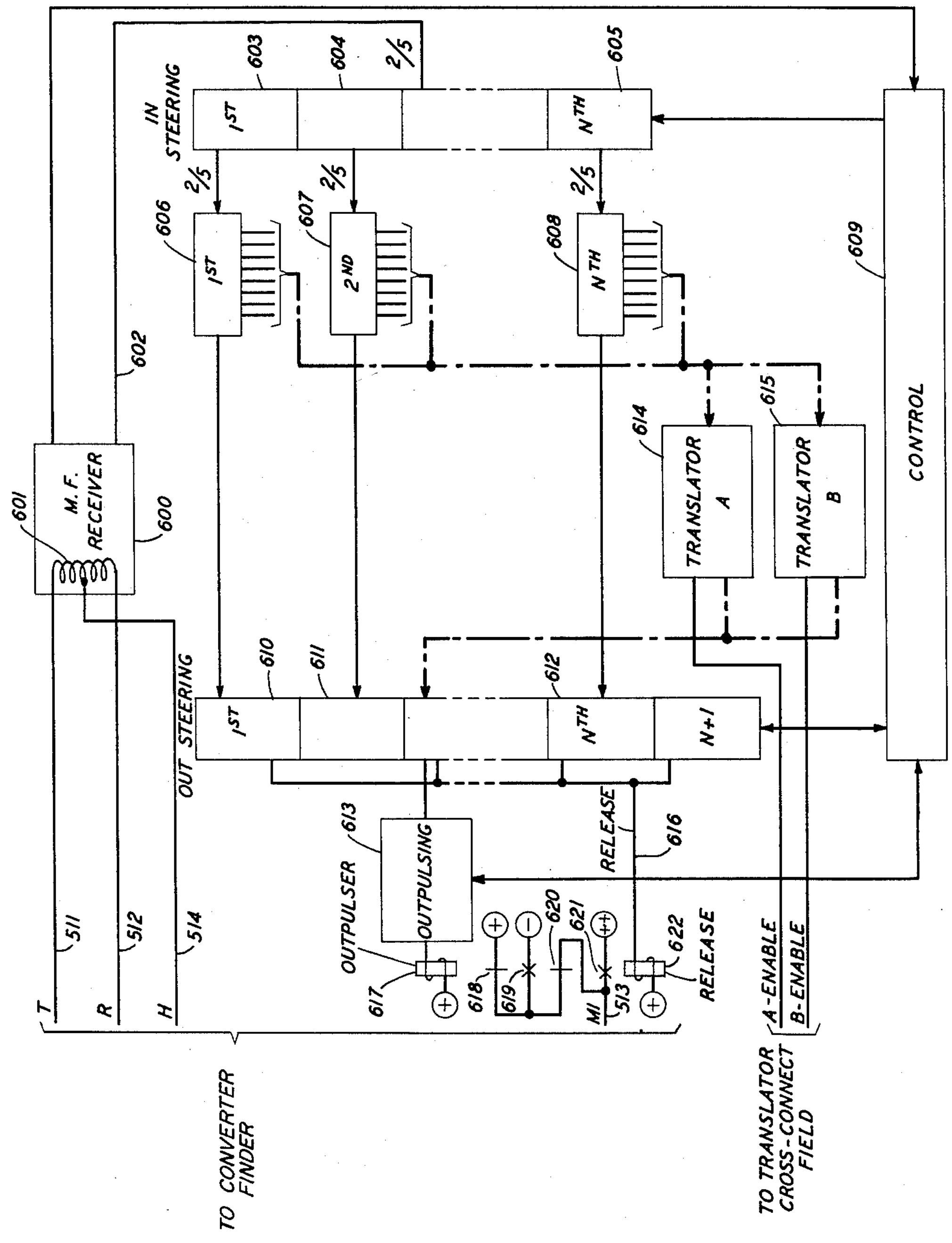
FIG. 6 is a block diagram of a converter circuit as employed in this invention.

A converter which in accordance with this invention advantageously includes a plurality of translators is shown in block diagram form in FIG. 6. In FIG. 6 there is seen a multifrequency receiver 600 which responds to the multifrequency call signaling information from the subscriber's station 100 and in turn generates signals in a two-out-of-five code on conductor group 602. The output signals from the multifrequency receiver 600 are transmitted through the in-steering relays such as 603, 604, and 605 to the digit registers 606, 607, and 608. That is, the information representative of the first digit of a calling signal is transmitted through the first digit in steering relay 603 to the first digit register 606. Signals representative of subsequent digits are transmitted through the respective in-steering relays to the appropriate digit register relays. The converter control circuit 609 cooperates with the multifrequency receiver, the digit registers 606–608 and the out-pulsing circuit 613 to control the in-steering, out-steering and out-pulsing functions. As digits are registered in the converter the control circuit 609 causes the information stored in the digit registers 606 through 608 to be transferred in proper sequence to the out-pulsing circuit 613 which includes a set of read out relays. There is a nondestructive transfer of information from the register relays to the read out relays and the register relays 606 through 608 serve to maintain a record of the registered digits. The out-pulsing circuit 613 controls the out-pulsing relay 617 and thus controls the break contact 618 and the make contact 619. The out-pulsing relay 617 is unoperated when off-hook supervisory signals are to be transmitted and is operated when on-hook supervisory signals are to be transmitted. Accordingly, during periods of off-hook signaling the positive potential is connected though the break contact 618 of the out-pulsing relay 617 and through the break contact 620 of the release relay 622 to the M1 conductor 513. During on-hook supervisory signaling periods a negative potential is connected through the make contact 619 of the out-pulsing relay 617 and the break contact 620 of the release relay 622 to the M1 conductor 513. After the converter 320 has completed its work operations, a release signal on conductor 616 causes the release relay 622 to operate and thus place a high positive potential on the M1 signaling conductor 513 through the make contact 621. Operation of the release relay 622 serves to isolate the M1 conductor 513 from the on-hook and off-hook signaling potentials associated with the out-pulsing relay 617.

This invention is particularly concerned with the rapid release of the converter circuit and therefore attention is now directed to the use of multiple translators which are discrete to the PBX's served by the converter group. The translators 614 and 615 are connected in parallel to contacts of the register relays and the translators are selectively enabled in accordance with a control signal which originates in the PBX to central office trunk termination on the converter finder 310.

Figure 5:
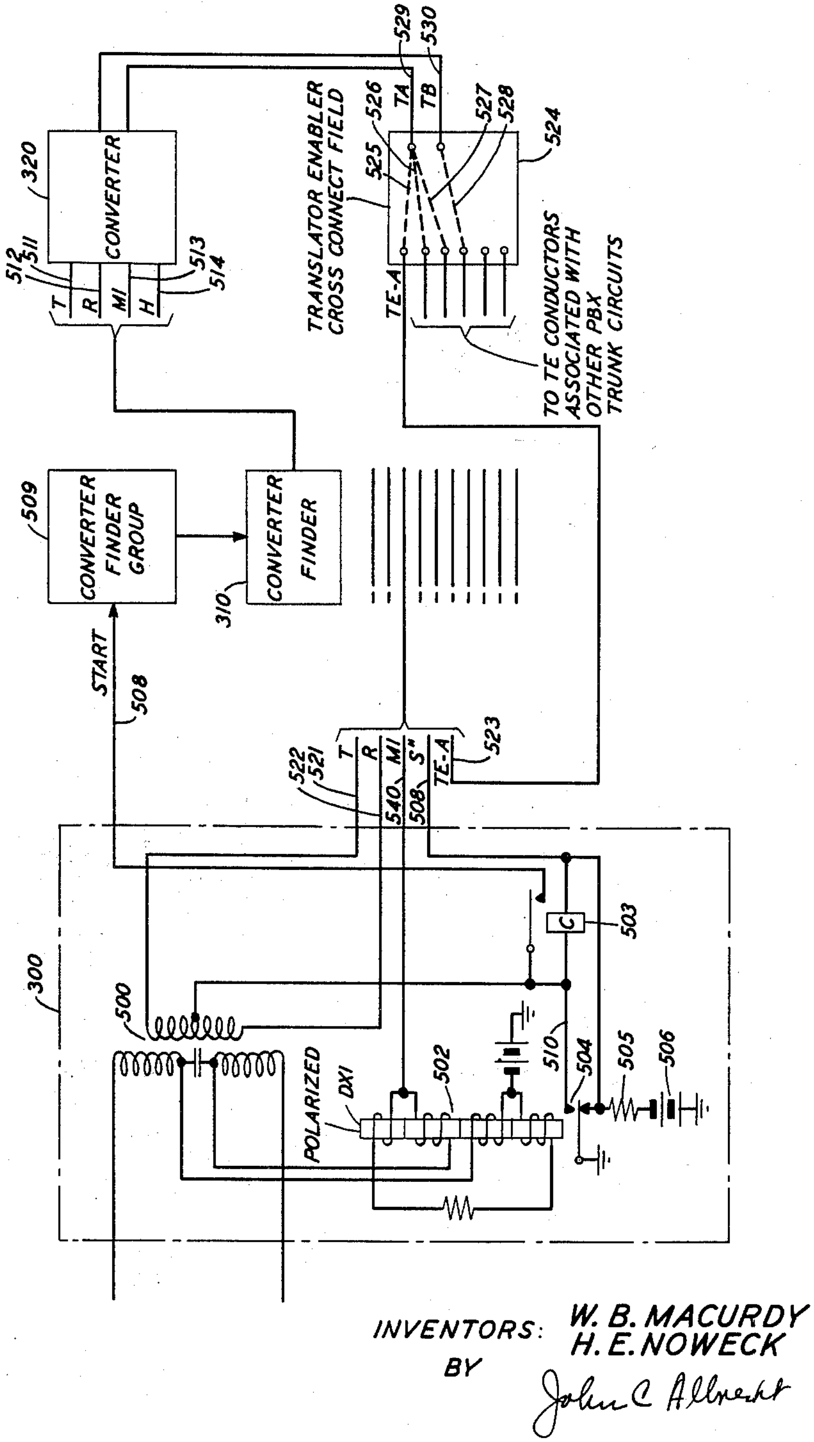
FIG. 5 is a schematic diagram of the central office end of the modified DX trunk and of the translator enable cross-connect field.

In FIG. 5 the converter finder 310 is a five-wire finder. That is, for every position in the banks of the finder there are five terminals associated therewith. The T, R, and M1 conductors are connected through the bank and jacks of the finder 310 to the converter 320. The S″ conductor 508 terminates within the converter finder control circuitry and a ground is returned from the converter finder over the S″ conductor after the finder hunting procedure has been completed. The translator enable conductor 523 terminates on the banks of the finder 310, and the wiper which contacts the S″ conductors and the wiper which contacts the translator enable conductors are connected together. Accordingly, after the converter finder has ceased hunting and the trunk circuit 300 has been connected through to the converter 320, the translator enable conductor 523 assumes the potential of the S″ conductor 508, namely, ground potential. The translator enable conductors such as 523, which are individually associated with trunk circuits such as 300, terminate on the translator cross-connect field 524. Translator enable conductors for trunks such as 300, which are associated with PBX A, are cross-connected in the field 524 to the translator enable A conductor 529. For example, in FIG. 5, the first three trunks are connected by means of jumpers 525, 526, and 527 to the translator A conductor 529, while the fourth trunk is connected by means of the jumper 528 to the translator B conductor 530. The translator enable cross-connect field 524 is discrete to the converter 320.

Figure 7:
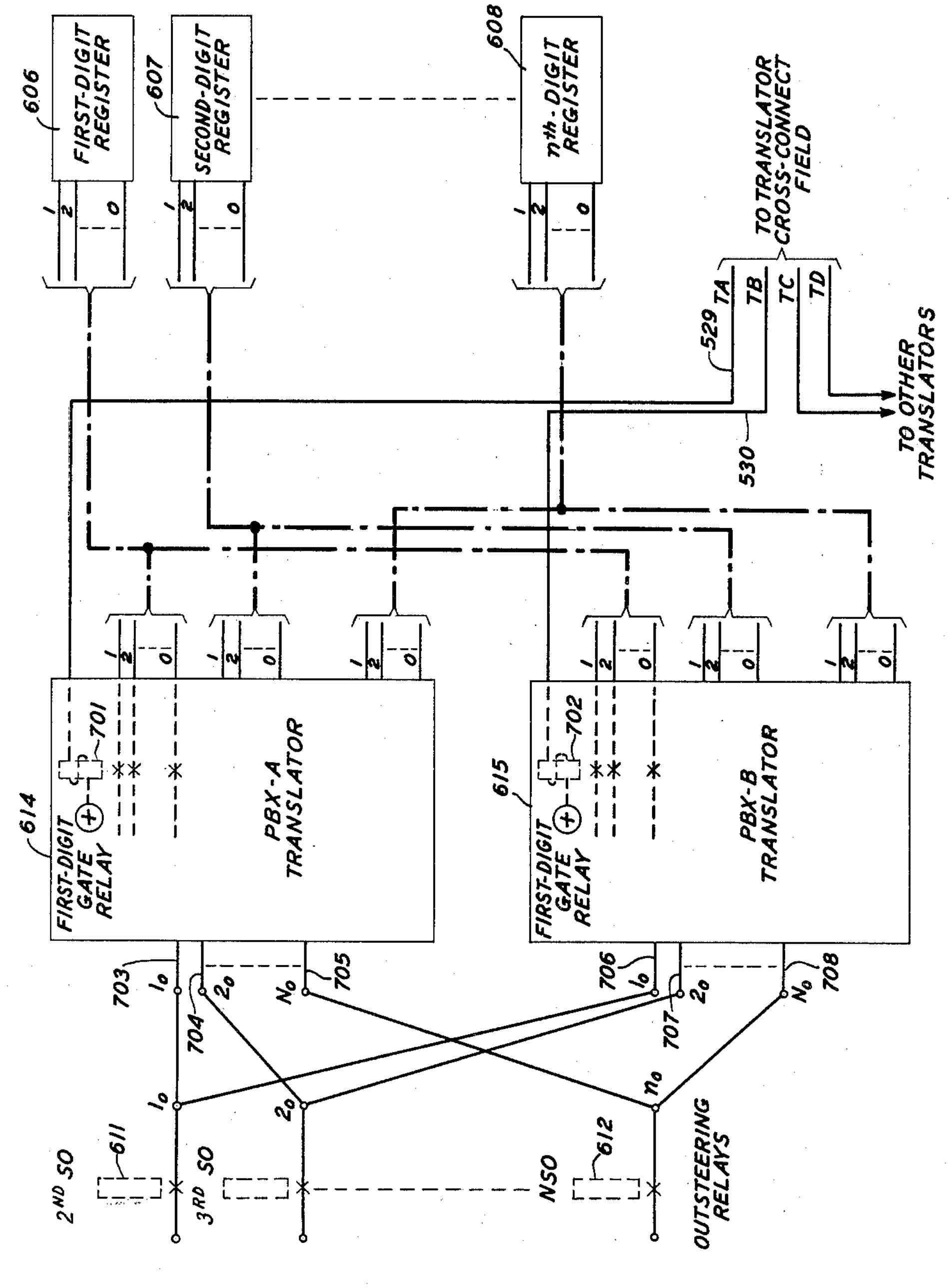
FIGS. 7, 8 and 9 are schematic diagrams showing additional details of the converter of FIG. 6.
Figure 8:
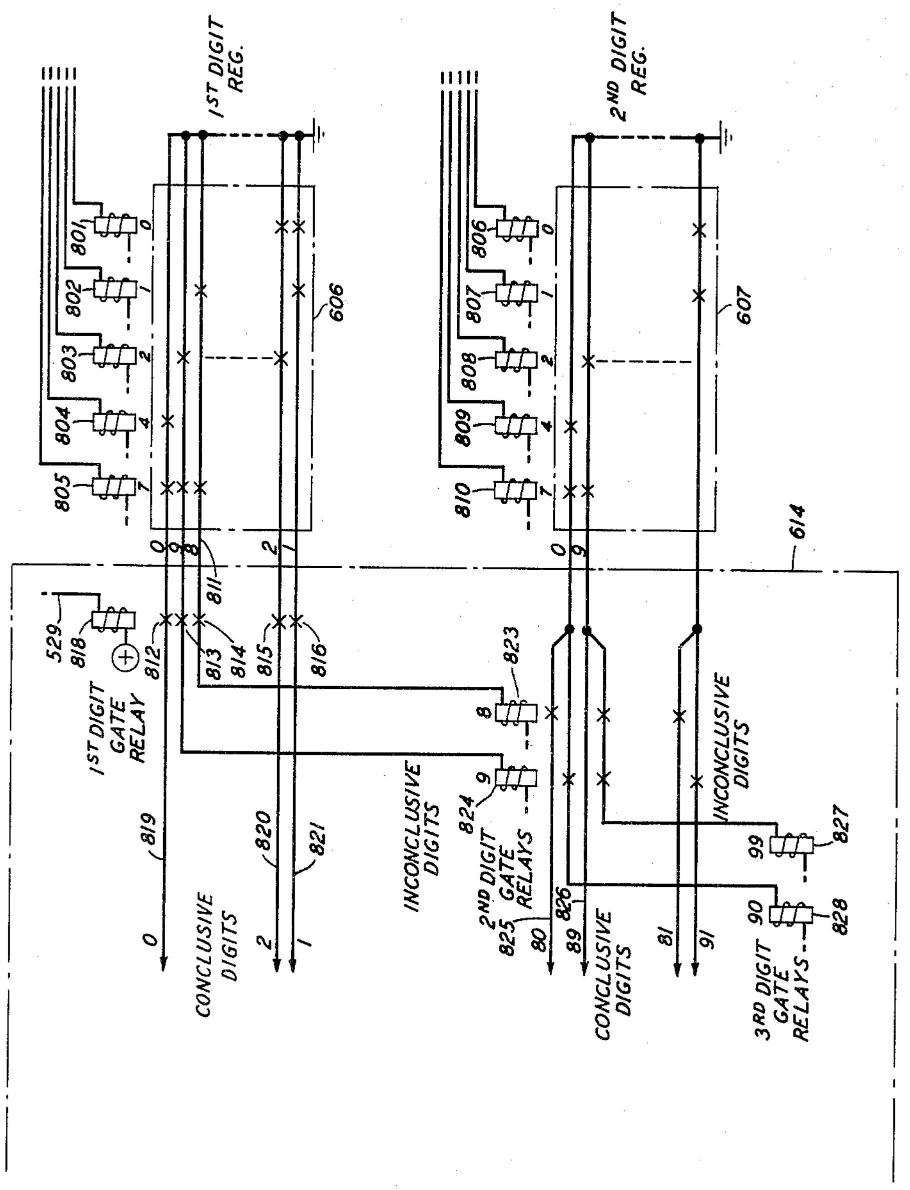
Figure 9:
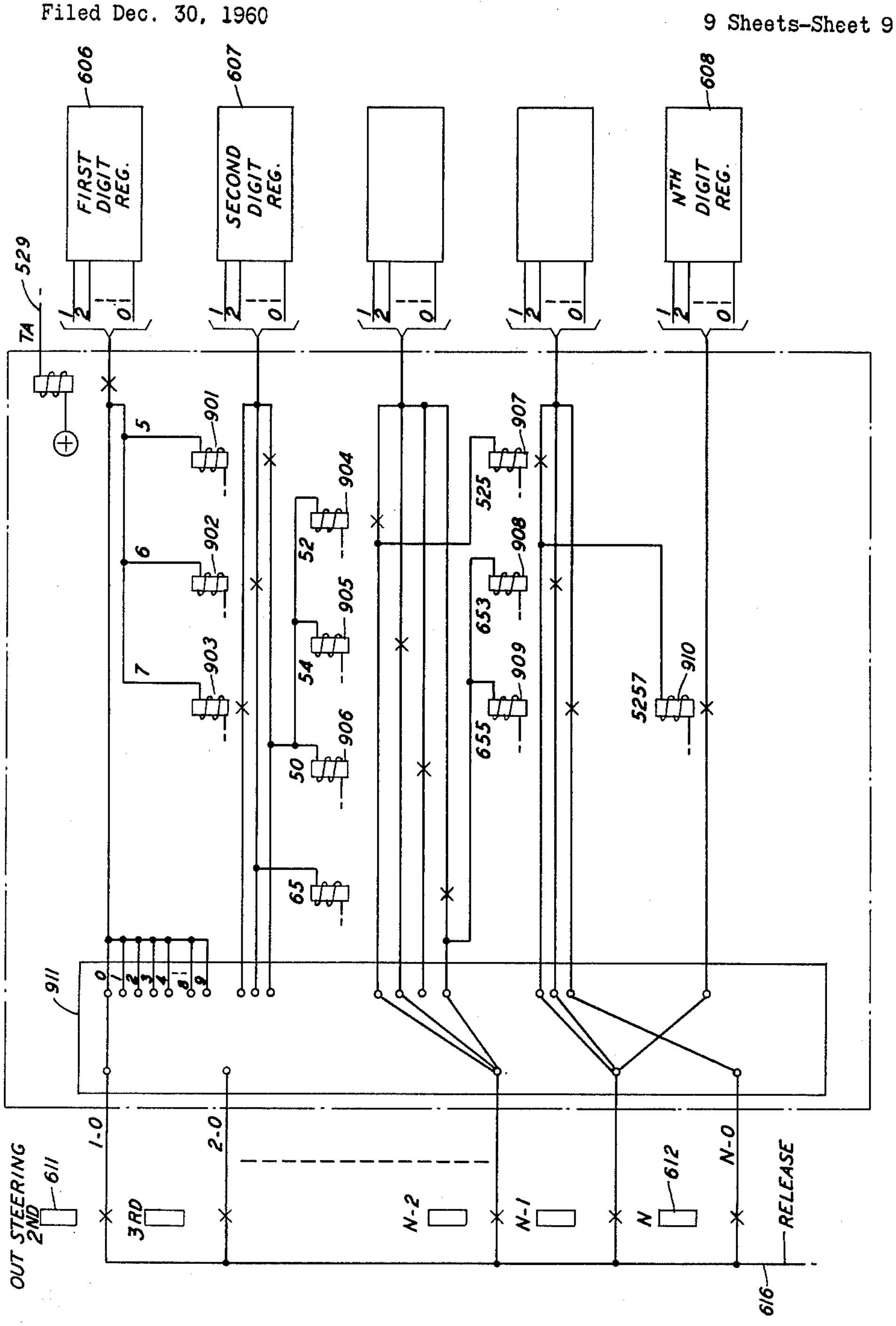

The organization of the translators 614 and 615 is shown in greater detail in FIGS. 7, 8 and 9. As previously noted, information is transmitted to the digit registers such as 606 through 608 in a two-out-of-five code. The output conductors of the digit registers 606 through 608, however, are on a decimal basis and associated with each digit register are ten output conductors labeled 0 through 9. In FIG. 7, the 0 through 9 output conductors of the first digit register 606 are connected to both the first and second translators 614 and 615 in parallel. Similarly, the 0 through 9 output conductors of the subsequent digit registers 607 and 608 are connected in parallel to the translators 614 and 615. Only one of the translators 614 and 615 is operative on any particular call as the translator enable conductors 529 and 530 are energized on a mutually exclusive basis. That is, on a call from PBX A the TA conductor 529 becomes grounded to energize the first digit gate relay 701 in the PBX A translator 614, and on a call from PBX B the TB conductor 530 becomes grounded to energize the first digit gate relay 702 of the PBX B translator 615. The PBX A and PBX B translators 614 and 615 are shown in greater detail in FIGS. 8 and 9. These translators selectively provide output signals on the 2–0 through N–0 conductors 703 through 705 in the case of the PBX A translator 614 and on the 2–0 through N–0 conductors 706 through 708 in the case of the PBX B translator. That is, in accordance with the rule of action of the translator, one of the output conductors 703 through 705 or 706 through 708 is enabled after a conclusion has been reached as to the number of digits required to complete the call. The translator output conductors are connected through auxiliary contacts on the out-steering relays 610 through 612. The auxiliary contacts of the out-steering relays 611 and 612 are in turn connected to the release relay 622 and a release mark is placed on the M1 conductor 513 after the last digit has been out-pulsed.

In FIG. 8 there are shown the register relays 801 through 810 of the first and second digit registers which, as previously explained, are operated on a two-out-of-five code basis from output signals of the multifrequency receiver 600. Contacts on the register relays are arranged to make the conversion from a two-out-of-five code registration to a one-out-of-ten output signal. That is, in FIG. 8 the contacts of the relays 801 through 805 are arranged to provide ground output signals on the one through zero conductors. For example, a contact of the one relay 802 and a contact of the seven relay 805 are connected in series and are arranged to cause a ground to appear at the eight output conductor 811 when the number eight has been registered. The decimal output conductors of the first digit register are connected to the contacts 813 through 816 of the first digit gate relay 818. The arrangement of the translator of FIG. 8 is but illustrative and represents translation for an office having particular numbering plan requirements. Assuming that the translator of FIG. 8 is the A translator 614, the winding of the first digit gate relay is connected to the TA conductor 529. As shown in FIG. 5, the TA conductor terminates on the translator enable cross-connect field 524. If the call in progress is from a station of PBX A, the first digit gate relay 818 will be energized and the decimal output conductors of the first digit register will be connected through contacts of the gate relay 818 to the circuitry of the translator 614. In the illustrative numbering plan of FIG. 8 the numerals 1, 2, and 0 are conclusive numbers in the case of the first digit of PBX A while the numerals 8 and 9 are inconclusive. The wiring associated with the numerals 3 through 7 is not shown and these may be either conclsuive or nonconclusive, depending upon the PBX numbering plan. Numerals 1, 2, and 0 are designated conclusive digits as these numerals fully define the number of digits which will be required to complete the call. In FIG. 8 the numerals 8 and 9 in the case of the first digit are designated inconclusive digits as further information must be registered before the converter can determine the number of digits to be expected. If the first digit registered is a one, two, or zero, the appropriate one of the conductors 819 through 821 will be grounded. The eight output conductor 811 of the first digit register is connected to the winding of the eight gating relay 823 and the nine output conductor 813 is connected to the winding of the nine gate relay 824. Although the output conductors of the digit registers are connected in parallel to a plurality of translators which are associated with the converter, these conductors are effective only in the enabled translator. That is, information from the first digit register relays provide signals only to the enabled translator as the output of the first digit register relays must pass through make contacts of the first digit gate relay 818 and information from subsequent digit registers must pass thorugh contacts of gate relays such as 823 and 824 which are enabled only after the first digit gate relay has operated. On calls in which the first digit registered is an eight, the eight gating relay 823 will be operated and if the second digit registered is a zero, the conclusion is reached as to the number of digits expected and the 80 conductor 825 is grounded. If the second digit registered is a nine, the 89 conductor 826 will similarly be grounded. Where the digits 99 are the first two digits registered, the nine gating relay 824 and the 99 gating relay 827 will be enabled, and if the first two digits registered are 90, then the nine gate relay 824 and the 90 gate relay 828 will be operated. The connection of the conclusive and nonconclusive output conductors, such as 819, 820, 821, 825 and 826 is shown in FIG. 9.

In FIG. 9 a number of digit registers 606 through 608 are shown at the right side of the drawing. Associated with each digit register are the ten decimal translator output conductors which are labeled 1 through 0. In the numbering plan to which the translator of FIG. 9 applies, the numerals 5, 6 and 7 of the first digit are inconclusive numerals and further information must be registered before a conclusion can be reached as to the number of digits required to complete the call. The numerals 0, 1, 2, 3, 4, 8 and 9 are conclusive numerals for the digit and these are connected through the appropriate auxiliary contacts of the out-steering relays such as 611 and 612. If the first digit registered is a 0, an operator call is indicated and it is concluded that only one digit is required to complete the call. The 1–0 output conductor, which is the first output conductor of the translator such as 614, is connected to the release lead 616 through the make contact of the second out-steering relay 611 as shown in FIG. 9. Accordingly, the converter is released when the second out-steering relay is operated which is immediately after the first digit has been outpulsed. If the first digit registered is a five, the five gate relay 901 is operated; if the first digit registered is a six, a six gate relay 902 will be operated; and if the first digit registered is a seven, the seven gate relay 907 will be operated. Operation of one of the first digit gate relays 901, 902 or 907 prepares paths for operating similar subsequent gate relays or for enabling the release conductor if a conclusion is reached as to the number of digits expected. The conclusive digit conductors are connected through auxiliary contacts of the appropriate out-steering relays. These conductors are connected through contacts of out-steering relays which bear numbers which are one larger than the number of digits to be out-pulsed. For example, if four digits are to be registered and out-pulsed, the conclusive digit conductor information will be connected through an auxiliary contact of the fifth out-steering relay. Accordingly, after the last expected digit has been out-pulsed and the out-steering chain advances as though an additional digit were to be out-pulsed, the release signal will be transmitted through the auxiliary contact of the out-steering relay and the converter will be immediately released for further service. An $N+1$ out-steering relay provides a release path on calls which require the maximum number of digits. As previously noted when the release conductor 616 becomes grounded through contacts of the translator relays, the release relay 622 will operate to provide the necessary signal on the M1 conductor 513 to operate the marginal relay 421 at the PBX. This breaks the holding path for the A relay 401 which releases and transfers the tip and ring conductors 406 and 407 from the line finder 110 to the tip and ring conductors 408 and 409 to the first selector 112. The B relay 404 holds operated to ground potential from the sleeve 400. Therefore, the original operating path for the A relay 401 is broken at the contact 403 of the B relay 404. The signaling function is thus completed and the appropriate connection is established from the subscriber's station 100 through the line finder 110, the first selector 112 and the remaining switches of the train to the called subscriber's station. When the calling subscriber 100 hangs up the line finder 110, the first selector 112 and the succeeding switches of the train will release and ground potential will be removed from the sleeve conductor 400. The B relay 404 then releases and the converter trunk circuit 111 is again prepared to accept another call.

It is to be understood that the above-described arrangements are illustrative of the application of the principles of the invention. Numerous other arrangements may be devised by those skilled in the art without departing from the spirit and scope of the invention.

What is claimed is:

1. A telephone switching system comprising a plurality of private branch exchanges, a plurality of stations in each of said exchanges, each of said stations including keyset call signaling apparatus, a plurality of converters in a central office common to said plurality of private branch exchanges for registering call signaling information from said stations and for transmitting dial pulse signals to said private branch exchanges in response thereto, a plurality of connecting means discrete to said private branch exchanges for connecting said private branch exchanges to said converters, means individual to said connecting means for providing a converter control signal, and means in said converters responsive to said converter control signals for altering the operation of said converters.

2. A telephone switching system in accordance with claim 1 wherein said keyset call signaling apparatus is multifrequency call signaling apparatus.

3. A telephone switching system in accordance with claim 1 wherein said means responsive comprises a plurality of translators individual to said private branch exchanges for determining the number of digits required to complete a call.

4. A telephone switching system in accordance with claim 3 wherein said converters each comprise a plurality of digit registers having input and output conductors, said output conductors of said digit registers connected in parallel to the input terminals of said plurality of translators.

5. A telephone switching system in accordance with claim 4 wherein said converters include a plurality of out-steering relays, all except the first of said out-steering relays having a set of release contacts thereon and means connecting said translators to said release contacts of said out-steering relays.

6. A telephone switching system in accordance with claim 5 wherein said plurality of out-steering relays comprises $N+1$ relays where N equals the maximum number of digits to be registered and outpulsed by the converter.

7. A telephone switching system in accordance with claim 1 wherein said connecting means comprises a trunk circuit having a first polarized relay at said central office and a second polarized relay at said private branch exchange, said polarized relays each responsive to bipolar signals of a first voltage level from the remote end of the trunk circuit and a marginal relay at said private branch exchange responsive to a release signal of a second voltage level which exceeds said first voltage level from said converter.

8. In a private branch exchange telephone system, tone signaling means, a converter circuit, a plurality of digit registers in said converter circuit, means for connecting said converter circuit to said tone signaling means, and means for releasing said converter circuit from said signaling means, said releasing means including translator means including a plurality of relays having their windings connected to certain output leads of one digit register and their contacts connected to output leads of the succeeding digit register in accordance with the particular numbering plan of the private branch exchange.

9. In a telephone system wherein different pluralities of digits are employed for different possible designations within the system, a plurality of subscriber sets each having tone signaling means, converter means for detecting said tone signals, a plurality of digit registers, there being at least one digit register for each possible successive digit position from said tone signaling means, translator means connected to said digit registers, said translator means including input leads connected to the outputs of certain of said registers, output leads for certain of said digit positions for the particular digits at that position which are conclusive of one of said designations, and relay means having windings energized by register outputs of one digit position and contacts connected to the register outputs of a succeeding digit position for digits at said one position which are not conclusive of one of said designations, and means responsive to a signal on one of said output leads for releasing said converter.

No references cited.